A. H. CAMERON.
PULLEY CLUTCH.
APPLICATION FILED JULY 1, 1909.
939,663.
Patented Nov. 9, 1909.
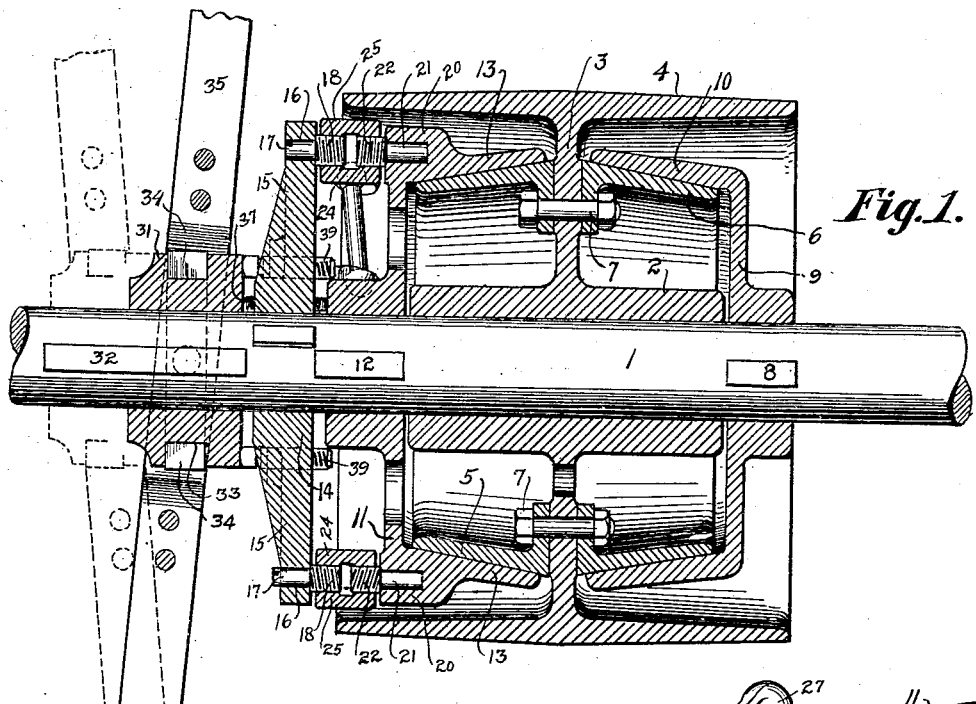
Fig. 1.
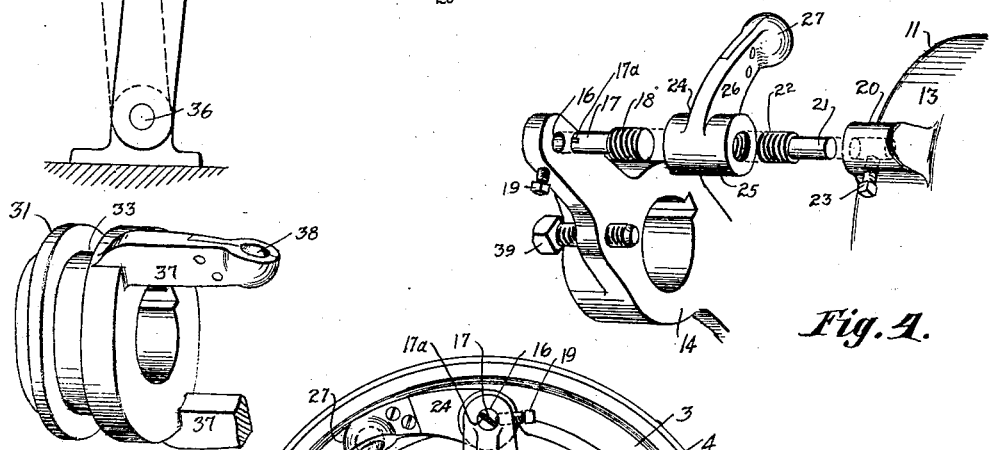
Fig. 3.
Fig. 4.
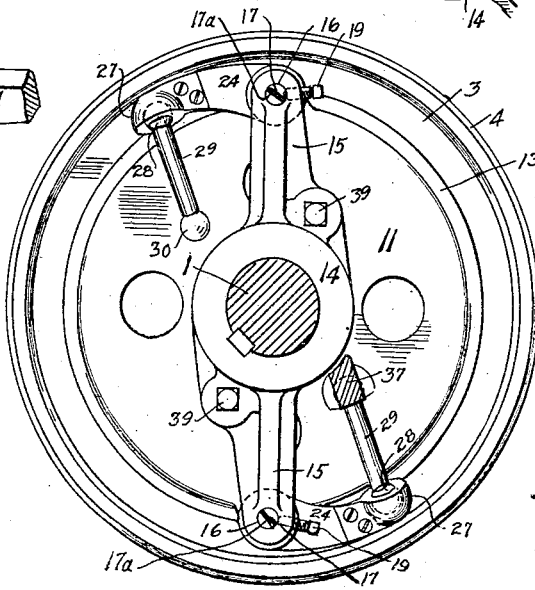
Fig. 2.
Witnesses
Jos J Hosler.
Irene Lutz.
Inventor
Arthur H. Cameron
By
Bond & Miller
Attorneys

UNITED STATES PATENT OFFICE.

ARTHUR H. CAMERON, OF KNOX TOWNSHIP, COLUMBIANA COUNTY, OHIO.

PULLEY-CLUTCH.

939,663.

Specification of Letters Patent.

Patented Nov. 9, 1909.

Application filed July 1, 1909. Serial No. 505,396.

*To all whom it may concern:*

Be it known that I, ARTHUR H. CAMERON, a citizen of the United States, residing in Knox township, in the county of Columbiana and State of Ohio, have invented a new and useful Pulley-Clutch, of which the following is a specification.

My invention relates to improvements in clutches and especially to frictional clutches and the operative mechanism therewith connected, the said invention being peculiarly adapted for use on pulleys, but being of such nature that it may be adapted to various other purposes for which a friction clutch is desired: the objects of the improvement being to provide a simple, cheaply constructed and efficient clutch which will prove thoroughly satisfactory in use and will be adapted to fully accomplish its purposes. I attain the object mentioned, together with other objects which will be apparent to those skilled in the art, by the construction illustrated in the accompanying drawing in which—

Figure 1 is a vertical longitudinal section through a clutch embodying my invention. Fig. 2 is an end view of the same device, the sliding head and lever being omitted to more fully disclose the construction of the remaining parts. Fig. 3 is a perspective view of the sliding head one of the arms being broken away. Fig. 4 is a detached fragmentary view illustrating the spider and also the screw pins, screw arm and slidable clutch member on one side of the clutch.

Throughout the several views similar numerals of reference indicate similar parts.

The numeral 1 indicates a rotatable shaft upon which the hub 2 of a pulley is rotatably mounted. Formed integrally with the hub 2 is the web 3 and formed integrally with the web 3 is the face 4. The annular, externally inclined cone members 5 and 6 are connected to the web 3 by the bolts 7 or their equivalents. It will be noted that the members 5 and 6 taken together in their attached position constitute a double inclined cone having oppositely tapered clutch surfaces.

Fixedly mounted upon the shaft 1 and keyed thereto by a key at 8 is a relatively stationary cup member 9 provided with an annular integral flange 10, the inner inclined face of which is adapted to frictionally engage the external inclined face of the cone member 6 when the said cone member is slidably moved toward the said cup member.

The slidable cup member 11 is mounted upon the shaft 1 and adapted to slide longitudinally thereon but is prevented from rotation with reference to said shaft by a feather key at 12. The cup member 11 is provided with the integral annular flange 13, the inner surface of which is adapted to frictionally engage the outer surface of the cone member 5 when the cup member 11 is moved toward said cone member. Fixedly mounted upon the shaft 1 and rotatable therewith is the spider 14. It will be understood that while no relative rotation as between the spider 14 and the cup member 11 may occur, yet the said cup member may be slidably adjusted longitudinally of the shaft with reference to the said spider. Formed integrally, the arms 15 extend from the body of the spider in substantially diametrically opposite directions and are provided at their outer ends with apertures 16, the axis of said apertures being arranged parallel with the axis of the shaft 1. Arranged in each of the apertures 16 is the stem portion 17 of a screw pin provided with the integral screw threaded portion 18. A set screw 19 is arranged in a screw threaded aperture in each arm and extends to the stem 17 with which the said set screw engages for the purpose of holding the stem 17 in fixed adjustment with relation to the spider.

Formed integrally with the cup member 11 and opposite the ends of the arms 15 are the pin cups 20 each provided with an aperture disposed parallel with the shaft 1 into which the stem 21 of a screw pin is adapted to be inserted, the screw threaded portion 22 of said screw pin being formed integrally with the stem 21. The set screw 23 is arranged in a screw threaded aperture in the pin cup and is adapted to engage the stem 21 to hold said stem in fixed adjustment within the aperture in the pin cup. It should be noted that the screw threads 18 and the screw threads 22 are relatively right and left threaded and that when the stems 17 are properly located in their apertures in the arms 15 and the stems 21 are likewise located in the apertures in their appropriate pin cups the said screw pins connected to the spider and to the slidable cup member 11 will be arranged in opposing pairs, each pair of screw pins being in alinement.

The screw arms 24 are provided with a barrel portion 25 disposed parallel with the axis of the shaft 1 and provided with an aperture extending through said barrel portion and provided at one end with right and at the other end with left screw threads in which the screw threaded portions 18 and 22 of the screw pins are adapted to be located. Formed integrally with each barrel portion 25 is an arm 26 which extends at right angles to the aperture in the barrel portion 25 and at its free end is provided with a socket 27 into which the ball 28 of one of the connecting rods 29 is adapted to be arranged. The other end of each connecting rod 29 is provided with the ball 30 for the purpose hereinafter described. It should be noted that the screw threaded portions of the screw pins are well entered into the screw threaded apertures in the barrel portions of the screw arms, as illustrated in Fig. 1 and it will be evident that as the barrel portions are rotated the screw pins will be brought closer together or moved farther apart from each other in accordance with the direction of rotation of the said screw arms. The arrangement of the threads should be such that when the free or socket ends of the arms 26 are moved outwardly or away from the shaft 1 the screw pins will be forced apart from each other by the rotation of the barrel portions.

The sliding head 31 is slidably mounted upon the shaft 1 but keyed against rotation on said shaft by a longitudinally disposed feather key at 32. An annular groove 33, concentrically arranged with reference to the shaft 1 is provided in the sliding head 31, and in said groove is arranged the annular collar 34 to which is pivotally connected the lever 35 pivoted to a fixed support at 36 by which the sliding movement of the head 31 may be readily controlled in the manner well known in clutch construction.

The head 31 is provided with the longitudinally disposed integral arms 37 provided at their free ends with the sockets 38, each of which sockets is adapted to receive one of the balls 30 of the connecting rods 29. It should be noted that the arms 37 are so arranged with reference to the arms 15 of the spider as not to interfere with the said arms 15, but to extend beyond the spider, as well illustrated in Figs. 1 and 2.

The fact that the spider 14 and the integral arms 15 thereof are fixedly mounted upon the shaft 1 has been heretofore mentioned. The screw pins connected to the said spider arms will therefore remain in a fixed position with relation to the shaft 1. The connecting rods 29 being appropriately arranged with the balls 28 in the sockets 27 and the balls 30 in the sockets 38, it will be understood that when the lever 35 is thrown into the position illustrated in dotted lines in Fig. 1, the arms 37 will be moved away from the spider, thus drawing the connecting rods 29 in the same direction. The only normal movement, of the arms 26 with reference to the screw pins is a rotating movement about the said pins upon which the barrels 25 are mounted, the sockets 27 being movable either toward or away from the shaft 1. As the head 31 draws the rods 29 away from the spider in the direction illustrated in dotted lines in Fig. 1, the socket ends of the arms 26 will be drawn toward the shaft 1, thus rotating the barrels 25 upon the screw pins in the direction adapted to bring the screw pins of the various pairs closer to each other, thus drawing the slidable cup member 11 toward the spider 14 and throwing the frictional surfaces of the cone members 5 and 6 out of engagement with the frictional surfaces of the cup members 11 and 9 and permitting the hub 2, with its integral and connected parts to rotate idly upon the shaft 1.

When the lever 35 is thrown from the position illustrated in dotted lines in Fig. 1 into the position illustrated in full lines in said figure, the sockets 38 will move beyond the spider 14 into the position illustrated in full lines in Fig. 1, thus pushing outwardly upon the outer ends of the connecting rods 29 and throwing the socket ends of the arms 26 away from the shaft 1 into the position illustrated in full lines in Figs. 1 and 2. When the arms 26 are so thrown outwardly the barrels 25 will be appropriately rotated to move the screw pins of the various pairs apart from each other, thus moving the slidable cup member 11 away from the spider 14 into the position illustrated in Fig. 1 and placing the contact surfaces of the cone members 5 and 6 into frictional engagement with the corresponding surfaces of the cup members 11 and 9 respectively and causing the said cone members 5 and 6, together with the connected parts of the pulley to rotate with the cup members 11 and 9 and the shaft 1.

In order to provide for maintaining the sliding head 31 in the position illustrated in Fig. 1 when the clutch surfaces are in engagement the various parts are so arranged that the sockets 38, when the lever 35 is in the position illustrated in full lines in Fig. 1, will be moved beyond the plane of rotation of the arms 26 about the screw pins. In this position any tendency of the sockets 27 to return toward the shaft 1 and thus loosen the clutch will only tend to push the sliding head 31 closer to the spider 14, as will be readily seen from an inspection of Fig. 1. As a means for limiting the movement of the sockets 38 beyond the plane of rotation of the arms 26 the set screws 39 are arranged in the spider 14, the heads of said set screws being so arranged as to engage the sliding head 31 when the said head is moved toward the spider 14. This feature is clearly illustrated in Fig. 1 and it will be noted that the amount of possible movement of the arms 37 and sockets 38 beyond the plane of rotation of the arms 36 may be very readily adjusted by means of the said set screws 39.

The engaging surfaces of the cone members 5 and 6 and the cup members 11 and 9 will be subject to wear, and it is partly for the purpose of accommodating the various parts to the said wear that the set screws 19 and 23 are provided whereby the portions 17 and 21 respectively may be adjusted within their appropriate apertures. It should also be noted that an important reason for the provision of the set screws 19 and 23 is to afford means whereby the degree of frictional contact between the clutch faces may be readily adjusted.

Attention should be directed to the simplicity of the construction herein illustrated and described and also to the simplicity of operation. It will be noted that the frictional surfaces are inclined and that they are brought into engagement by means of the connecting rods 29 and the arms 26 acting upon a lever principle in connection with a screw movement, the entire device thus providing means for producing powerful engagement between the frictional clutch surfaces, while being capable of easy operation.

For the purpose of adjusting the screw pins the slots 17ª are provided, into which slots an ordinary screw driver may be inserted; but it will be understood that other means of adjusting said screw pins may be employed without departing from the spirit of the invention.

I claim.

1. A pulley clutch comprising a rotatable shaft, a pulley rotatably mounted thereon, inclined clutch members fixedly mounted upon said pulley, a clutch member fixedly mounted upon said shaft on one side of said pulley and adapted to frictionally engage the clutch member upon said pulley, a second clutch member mounted upon said shaft and adapted for rotation therewith while being longitudinally slidable thereon, a spider fixedly mounted upon said shaft, screw pins adjustably connected to said spider, screw pins adjustably connected to said slidable clutch member, said screw pins arranged in alined pairs, barrels having internally right and left screw threaded apertures, said barrels mounted upon said screw pins and adapted for rotation thereon, the screws mounted on said spider and the screws mounted upon said movable clutch member being relatively right and left threaded, arms connected to said barrels, said arms provided with sockets, a sliding head mounted upon said shaft and adapted for rotation therewith while being adapted for longitudinal sliding movement thereon, arms connected to said head, said arms provided with sockets, connecting rods provided at both ends with ball shaped extremities, one end of each rod being arranged in the socket of one of the screw arms and the other end arranged in the socket in one of the arms of the sliding head, and means for sliding the said head on the shaft.

2. In a pulley clutch a rotatable shaft, a pulley rotatably mounted upon said shaft, said pulley provided with cone members having inclined frictional surfaces, a cup member provided with a frictional surface adapted to engage one of the frictional surfaces upon said pulley, said cup member fixedly mounted upon said shaft, a spider fixedly mounted upon said shaft, a cup member slidably mounted upon said shaft but keyed against rotation thereon, said slidable cup member provided with an inclined frictional surface adapted to engage the other frictional surface of the said cone members and screw operated mechanism between said spider and said slidable cup member for moving said slidable cup member toward said first mentioned cup member to bring the frictional clutch surfaces of the cone members and cup members into engagement.

3. In a pulley clutch a shaft, a pulley rotatably mounted upon said shaft, said pulley provided with two members having frictional surfaces, a third member fixedly mounted upon said shaft and provided with a frictional surface adapted to engage the frictional surface of one of the two members with which said pulley is provided, a spider fixedly mounted upon said shaft, a fourth member slidably mounted upon said shaft but keyed against rotation thereon, said fourth member provided with a frictional surface adapted to engage the frictional surface of the second member with which said pulley is provided, and screw means between said spider and said fourth member for moving said fourth member toward said third member to bring the frictional surfaces of the first and second members into engagement with the frictional surfaces of the third and fourth members.

4. In a device of the character described, a shaft, a pulley rotatably mounted upon said shaft, said pulley provided with frictional members, a frictional member fixedly mounted upon said shaft and adapted for engagement with one of the frictional members on said pulley, a frictional member slidably mounted upon said shaft and adapted for frictional engagement with the other frictional member on said pulley, a spider fixedly mounted upon said shaft, screw pins adjustably connected to said slidable member, screw pins adjustably connected to said spider, the screw pins connected to said slidable member and the screw pins connected to said spider being of relatively right and left thread, right and left threaded barrels connecting opposite pins upon said spider and said slidable member in pairs, and means for rotating said barrels upon said pins.

5. In a device of the character described a shaft, a pulley rotatably mounted upon said shaft, said pulley provided with a clutch member, a slidable clutch member mounted upon said shaft and adapted for sliding movement into engagement and out of engagement with the clutch member upon said pulley, said slidable clutch member adapted for rotation with said shaft, a spider fixedly mounted upon said shaft, screw threaded pins connected to said spider, screw threaded pins connected to said slidable clutch member, each of said screw threaded pins on said spider being in line with one of the screw threaded pins on said slidable member, said pins upon said spider and upon said slidable member provided with relatively right and left hand threads, a right and left threaded barrel arranged upon said screw threaded pins and adapted for rotation thereon to move said pins toward each other or away from each other, arms connected to said barrels and adapted for movement in a plane substantially at right angles to said shaft, a head adapted for rotation with said shaft but slidable longitudinally thereon, said head provided with arms, connecting rods, each connecting rod at one end connected to one of the arms of one of the barrels and at the other end connected to one of the arms of the slidable head, said slidable head adapted to move toward said spider until the points of connection between the arms on said head and said connecting rods have moved beyond the plane of rotation of the arms connected to said barrels, and means for limiting the sliding movement of the slidable head.

In testimony that I claim the above, I have hereunto subscribed my name in the presence of two witnesses.

ARTHUR H. CAMERON.

Witnesses:
WILLIAM H. MILLER,
IRENE M. LUTZ.